United States Patent
Bertram et al.

(10) Patent No.: US 9,934,204 B2
(45) Date of Patent: Apr. 3, 2018

(54) CONDITIONALLY RELOAD WORKAREA USER INTERFACES USING A FLAG INDICATOR TO BALANCE PERFORMANCE AND STABILITY OF WEB APPLICATIONS

(71) Applicant: Lenovo Enterprises Solutions (Singapore) Pte. Ltd., Singapore (SG)

(72) Inventors: Randal L. Bertram, Raleigh, NC (US); Alejandro M. Ortiz, Rochester, MN (US); Ryan P. Randolph, Rochester, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 265 days.

(21) Appl. No.: 13/691,636

(22) Filed: Nov. 30, 2012

(65) Prior Publication Data
US 2014/0157107 A1    Jun. 5, 2014

(51) Int. Cl.
G06F 17/22     (2006.01)
G06F 17/30     (2006.01)
G06F 17/27     (2006.01)

(52) U.S. Cl.
CPC ........ *G06F 17/2247* (2013.01); *G06F 17/272* (2013.01); *G06F 17/30* (2013.01); *G06F 17/3089* (2013.01); *G06F 17/30861* (2013.01); *G06F 17/30873* (2013.01); *G06F 17/30905* (2013.01); *G06F 17/30876* (2013.01); *G06F 17/30899* (2013.01); *G06F 17/30908* (2013.01); *G06F 17/30911* (2013.01)

(58) Field of Classification Search
CPC ..... G06F 17/2247; G06F 17/24; G06F 17/211
USPC ......................................................... 715/234
See application file for complete search history.

(56) References Cited

U.S. PATENT DOCUMENTS 5,907,681 A * 5/1999 Bates et al. ................... 709/228
6,167,453 A    12/2000 Becker et al.
6,636,863 B1   10/2003 Friesen
(Continued)

FOREIGN PATENT DOCUMENTS

CN     101122921 A     2/2008
GB       2475816 A     6/2011

OTHER PUBLICATIONS

U.S. Appl. No. 13/784,668, filed Mar. 4, 2013.
(Continued)

*Primary Examiner* — Cesar B Paula
*Assistant Examiner* — Luu-Phuong T Nguyen
(74) *Attorney, Agent, or Firm* — Zilka-Kotab, P.C.

(57) ABSTRACT

In one embodiment, a system for conditionally refreshing workarea user interfaces (UIs) includes logic adapted to receive a request to refresh one or more workarea UIs, wherein the one or more workarea UIs are provided within a document object model (DOM), logic adapted to determine whether to reload the DOM or to refresh the one or more workarea UIs within the DOM without reloading the DOM; logic adapted to reload the DOM when it is determined to reload the DOM; and logic adapted to refresh the one or more workarea UIs without reloading the DOM when it is determined to refresh the one or more workarea UIs. Other systems, methods, and computer program products for conditionally refreshing workarea UIs are described according to more embodiments.

29 Claims, 3 Drawing Sheets

(56) References Cited

U.S. PATENT DOCUMENTS

| | | | |
|---|---|---|---|
| 6,826,594 | B1 | 11/2004 | Pettersen |
| 7,072,934 | B2 | 7/2006 | Helgeson et al. |
| 7,685,229 | B1* | 3/2010 | George et al. ............... 709/203 |
| 8,407,576 | B1 | 3/2013 | Yin et al. |
| 8,799,353 | B2 | 8/2014 | Larsson et al. |
| 9,483,571 | B2 | 11/2016 | Bertram et al. |
| 2004/0177147 | A1* | 9/2004 | Joshi .................. G06F 17/3089 709/227 |
| 2006/0031479 | A1 | 2/2006 | Rode |
| 2006/0047728 | A1* | 3/2006 | Kim .................. G06F 17/30899 |
| 2007/0208641 | A1* | 9/2007 | Smith et al. ................ 705/35 |
| 2007/0245238 | A1* | 10/2007 | Fugitt et al. ................ 715/700 |
| 2008/0177994 | A1* | 7/2008 | Mayer .................. G06F 9/4418 713/2 |
| 2008/0195483 | A1 | 8/2008 | Moore |
| 2009/0070190 | A1* | 3/2009 | Gorty et al. ................ 705/10 |
| 2009/0094377 | A1 | 4/2009 | Zahavi et al. |
| 2009/0210781 | A1* | 8/2009 | Hagerott et al. ............. 715/234 |
| 2009/0282096 | A1* | 11/2009 | Kamrowski et al. ......... 709/203 |
| 2009/0313601 | A1 | 12/2009 | Baird et al. |
| 2010/0138772 | A1* | 6/2010 | Garcia et al. ................ 715/774 |
| 2010/0180082 | A1 | 7/2010 | Sebastian et al. |
| 2010/0228963 | A1* | 9/2010 | Kassab et al. ................ 713/150 |
| 2011/0119268 | A1 | 5/2011 | Rajaram et al. |
| 2011/0161797 | A1 | 6/2011 | Dewar et al. |
| 2011/0197124 | A1 | 8/2011 | Garaventa |
| 2011/0264736 | A1 | 10/2011 | Zuckerberg et al. |
| 2012/0060160 | A1* | 3/2012 | Krauss ................ 718/102 |
| 2012/0191760 | A1 | 7/2012 | Kaufman et al. |
| 2013/0080518 | A1* | 3/2013 | Shionoya .......... G06F 17/30867 709/203 |
| 2013/0238423 | A1 | 9/2013 | Pottjegort |
| 2013/0326474 | A1* | 12/2013 | Lane ............... 717/107 |
| 2014/0157106 | A1 | 6/2014 | Bertram |
| 2014/0250366 | A1 | 9/2014 | Bertram et al. |
| 2016/0239477 | A1 | 8/2016 | Bertram et al. |

OTHER PUBLICATIONS

U.S. Appl. No. 13/691,629, filed Nov. 30, 2012.
Bertram et al., U.S. Appl. No. 13/784,668, filed Mar. 4, 2013.
Non-Final Office Action from U.S. Appl. No. 13/691,629, dated Jan. 2, 2015.
David, J-L., "Cookielessdata Persistence is possible using these viable strategies," Tech Republic, Apr. 22, 2003, pp. 1-11.
Final Office Action from U.S. Appl. No. 13/691,629, dated Jun. 12, 2015, 31 pages.
Non-Final Office Action from U.S. Appl. No. 13/784,668, dated May 29, 2015, 28 pages.
Advisory Action from U.S. Appl. No. 13/784,668, dated Dec. 21, 2015.
Notice of Allowance from U.S. Appl. No. 13/784,668, dated Feb. 4, 2016.
Non-Final Office Action from U.S. Appl. No. 13/691,629, dated Sep. 25, 2015.
Final Office Action from U.S. Appl. No. 13/784,668, dated Oct. 1, 2015.
Microsoft Computer Dictionary, Definition of "Dynamic Page," Microsoft Press, Fifth Edition, 2002, p. 182.
TechTarget.com, Definition of "Session ID," Jan. 2006, pp. 1-6, retrieved from http://web.archive.org/web/20101211095435/http://searchsoftwarequality.techtarget.com/definition/session-ID.
Notice of Allowance from U.S. Appl. No. 13/784,668, dated Jul. 15, 2016.
Final Office Action from U.S. Appl. No. 13/691,629, dated Mar. 24, 2016.
Bertram et al., U.S. Appl. No. 15/139,004, filed Apr. 26, 2016, pp. 1-45.
Office action from Chinese Application No. 201310627147.9, dated Aug. 1, 2016.

* cited by examiner

CONDITIONALLY RELOAD WORKAREA USER INTERFACES USING A FLAG INDICATOR TO BALANCE PERFORMANCE AND STABILITY OF WEB APPLICATIONS

BACKGROUND

The present invention relates to user interfaces, and more particularly, to balancing performance and stability of web applications by conditionally refreshing a workarea user interface (UI).

In web UIs, there is a growing interest in using Page-Oriented Assembly. The term "page-oriented" implies that each task is encapsulated in its own browser page. Each of the pages share common elements, such as a common header. But launching a task involves at least one page load, as opposed to a more desirable Asynchronous JavaScript and eXtensible markup language (XML) load, referred to as an AJAX load, which utilizes a background channel or pathway with which to load pages and/or exchange information with a server. AJAX is used extensively within the page, but not to load the page. As an example, some enterprise and/or cloud management solutions, such as IBM's PureScale, may be page-oriented, and load tasks using repeated page loads. In contrast, some systems managers or storage managers, such as IBM's Storwize, may use a single, long-running page on which each task is loaded, such as via AJAX.

A page-oriented design best accommodates the extensibility of modern UIs. For example, IBM's Flex Systems Manager (FSM) console includes plugins from many different exploiters or contributors, which may be created by different organizations, on different schedules, using different development practices, and possibly with different levels of expertise.

A page-oriented design helps deal with these inequalities in several ways. One way is by keeping each task in a separate page, the tasks are isolated and prevented from destabilizing the framework. Each page refresh completely cleans up between tasks, avoiding memory leaks and performance degradation. In addition, by keeping each task in a separate page, componentization is enforced so that tasks do not become interdependent without using well-architected application programming interfaces (APIs). Also, the page-oriented UI is better suited to the browser paradigm, naturally supporting multiple browser windows and tabs, bookmarks, and history. All of this is possible in a single-page UI, but not as easy.

The downside of a page-oriented UI is performance. Each page must load very quickly, or a user will prefer a different product that does not reload pages, even if this product becomes unstable after a long session. Web applications achieve fast page loads by getting initial content displayed while other content for the page is still loading. Though modern UIs operate in this way, pages may be very rich in content, even when they are first presented. Initial views require JavaScript libraries, which may require three seconds to load and parse, even when loaded from a browser's cache. The goal of one-second page transitions (relied on as an important threshold for quick UI activity) is theoretically achievable with page-oriented design, but challenging and costly.

Accordingly, a design which provides fast page transitions and stability would be very beneficial.

BRIEF SUMMARY

In one embodiment, a system for conditionally refreshing workarea user interfaces (UIs) includes logic adapted to receive a request to refresh one or more workarea UIs, wherein the one or more workarea UIs are provided within a document object model (DOM), logic adapted to determine whether to reload the DOM or to refresh the one or more workarea UIs within the DOM without reloading the DOM; logic adapted to reload the DOM when it is determined to reload the DOM; and logic adapted to refresh the one or more workarea UIs without reloading the DOM when it is determined to refresh the one or more workarea UIs.

In another embodiment, a method for conditionally refreshing workarea UIs includes receiving a request to refresh one or more workarea UIs, wherein the one or more workarea UIs are provided within a DOM, determining whether to reload the DOM or to refresh the one or more workarea UIs within the DOM without reloading the DOM, reloading the DOM when it is determined to reload the DOM, and refreshing the one or more workarea UIs without reloading the DOM when it is determined to refresh the one or more workarea UIs.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using the same browser page repeatedly to load individual workarea user interfaces (UIs), either new or reloaded, until certain conditions trigger a page reload, according to a navigational algorithm. One goal of this algorithm is to provide the performance of a one-page UI scheme, while maintaining the stability and other advantages of a page-oriented UI. Accordingly, a hybrid solution utilizes both page-oriented UI and single-page UI tools, while navigating between pages using page reloads when necessary, but otherwise by rebuilding the pages using JavaScript, Asynchronous JavaScript and eXtensible markup language (XML) (AJAX), and/or other suitable tools.

In one general embodiment, a system for conditionally refreshing workarea UIs includes logic adapted to receive a request to refresh one or more workarea UIs, wherein the one or more workarea UIs are provided within a document object model (DOM), logic adapted to determine whether to reload the DOM or to refresh the one or more workarea UIs within the DOM without reloading the DOM; logic adapted to reload the DOM when it is determined to reload the DOM; and logic adapted to refresh the one or more workarea UIs without reloading the DOM when it is determined to refresh the one or more workarea UIs.

In another general embodiment, a method for conditionally refreshing workarea UIs includes receiving a request to refresh one or more workarea UIs, wherein the one or more workarea UIs are provided within a DOM, determining whether to reload the DOM or to refresh the one or more workarea UIs within the DOM without reloading the DOM, reloading the DOM when it is determined to reload the DOM, and refreshing the one or more workarea UIs without reloading the DOM when it is determined to refresh the one or more workarea UIs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Any type of processor may be used, such as a central processing unit (CPU), an integrated circuit (IC), an application specific integrated circuit (ASIC), a field programmable gate array (FPGA), a microprocessor, etc.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
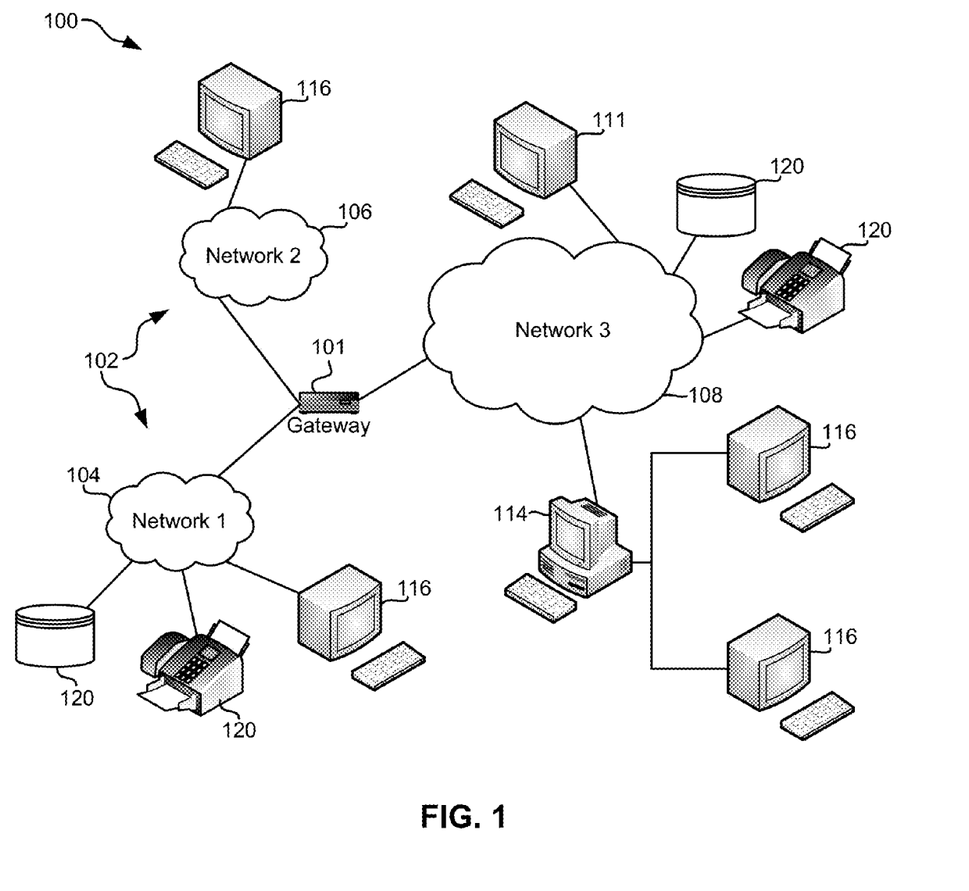
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
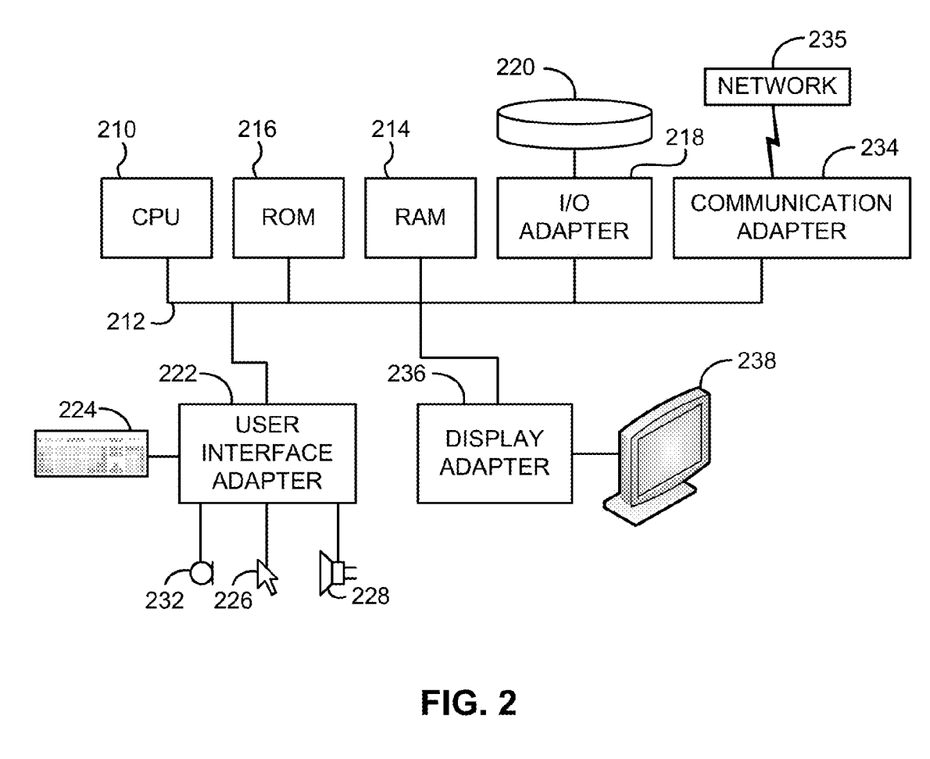
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

One fundamental difference when you navigate from one workarea UI to another is whether the new workarea UI will be loaded as a new page load, or whether it will be refreshed within the same DOM. When a new DOM is loaded, any kind of garbage or junk code that was in the old DOM and anything that was causing problems, is removed. Whereas if AJAX or some other suitable technique is used to simply refresh a workarea UI within the same DOM, all of the same material is potentially still in the DOM. When a workarea UI is refreshed within the same DOM, all of the JavaScript libraries do not have to be reloaded and it saves a lot of time. However, there are risks that over time the DOM deteriorates and items do not get cleaned up right and there are bugs in code and the bugs start to surface. The browser technology, and specifically the JavaScript, is not robust enough to prevent this from happening. Currently used browser technology typically is not capable of running an Enterprise system, so by dumping the DOM and loading it all over again and starting with a clean slate, these issues may be periodically resolved.

Figure 3:
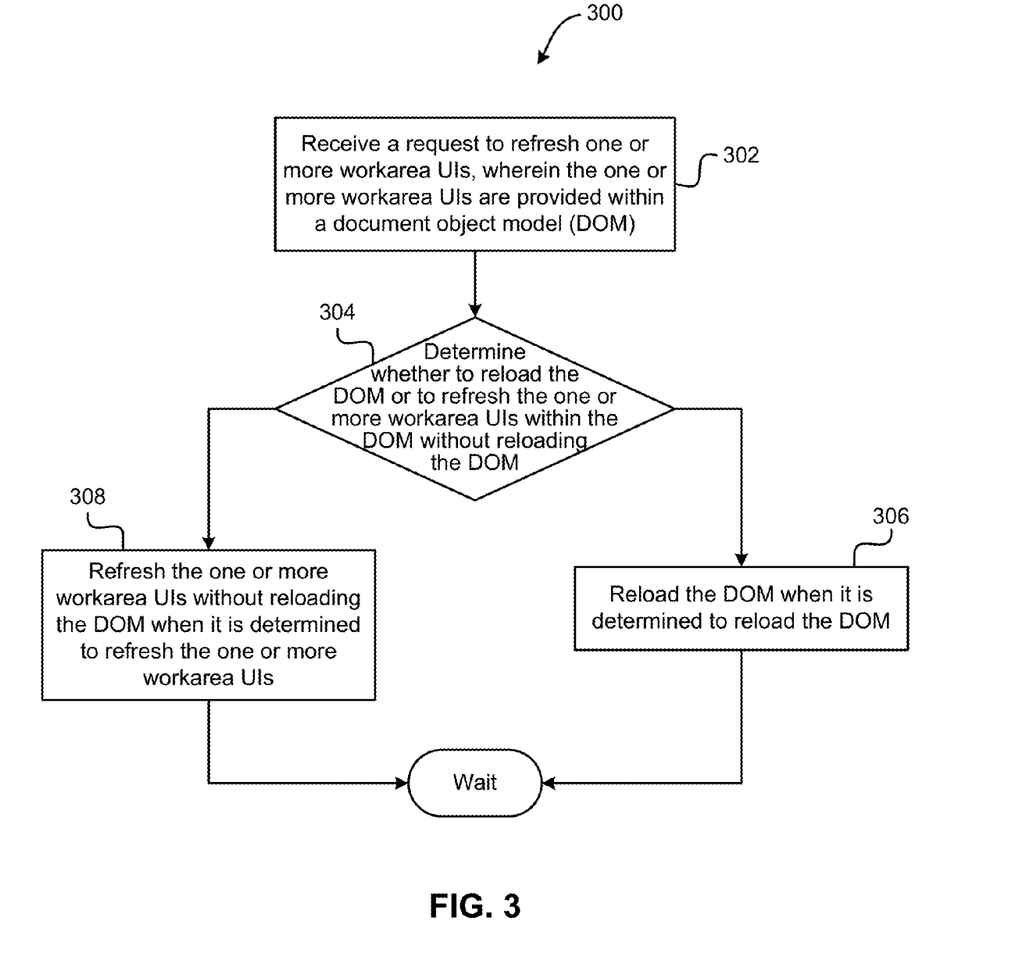
FIG. 3 shows a method for conditionally refreshing workarea user interfaces (UIs), according to one embodiment.

Now referring to FIG. 3, a method 300 for conditionally refreshing a workarea UI is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various non-limiting embodiments, the method 300 may be partially or entirely performed by an enterprise systems manager, a network controller, a computing system, a server, a processor (such as a CPU, an ASIC, a FPGA, etc.) which may be embedded in and/or operate within a system, etc.

As shown in FIG. 3, method 300 may initiate with operation 302, where a request to refresh a workarea UI is received. The workarea UI is part of a UI operating within a document object model (DOM), which may be referred to as a page or web page herein. The DOM may comprise a plurality of individual workarea UIs, each displaying content and/or being capable of receiving input from a user, each workarea UI being provided by a workarea program, application, or routine. Each workarea is capable of operating and displaying any number of widgets, applications, input/output I/O modules, etc., as would be known by one of skill in the art, and is capable of displaying in the workarea UI content to a display to be interacted with by a user and/or receiving content from a display via an I/O module provided on the workarea UI operating within the DOM.

This request may be generated by any source, such as from a server or computing system providing the content, from a server or computing system hosting the content, from a routine or application (which may be executed on any server or computing system) which triggers the request due to some criteria being satisfied, such as a timer expiring, a user action, etc., or any other suitable requesting source.

In one embodiment, the request may be triggered due to a user action. For example, typically, the request will be generated when the user navigates to a new workarea UI. The request is sent in response to the user trying to navigate (perhaps by clicking a link, typing an address in an address field, typing a recognizable character string, etc.) from a current workarea UI, with the user's action indicating which new workarea UI is to be loaded.

For example, at each navigation to a new page, a request may be triggered to refresh content within one or more workarea UIs. However, any trigger may be used to generate the request, such as at expiration of a timer, after a certain amount of AJAX calls, or any other triggering event known in the art.

In operation 304, it is determined whether to reload the DOM or to refresh one or more workarea UIs within the DOM without a page reload. Any method of providing such a determination may be used. In one embodiment, an algorithm may be used to determine whether to reload the DOM or to refresh the one or more workarea UIs within the DOM.

This algorithm may rely on one or more conditions in order to provide the decision. The one or more conditions that may be used to trigger a page reload are described below. Other conditions may be used in addition to or in place of any conditions described herein. Of course, after implementation, a user may specify any additional conditions or remove any existing conditions from consideration, without expanding the scope of the algorithm.

1) Always or never: In this exemplary condition, each workarea UI may include some indicator that indicates whether the workarea UI is to be refreshed using a page reload or to rebuild the workarea UI within the same DOM (refresh the workarea UI). This indicator may be any suitable mechanism that is capable of relaying such information, such as a flag, bit, handle, configuration, etc. In one embodiment, the indicator may be a flag, and the UI may maintain a RELOAD flag, where TRUE indicates to always load each new workarea UI using a new page, and FALSE indicates to rebuild each new workarea UI in the same DOM. In other words, the flag flips between page-oriented (new page is loaded each time) and single-page (workarea UIs are refreshed within the same DOM) operation. The flag may default to FALSE or TRUE, and may be switched to the alternate selection at any time by a user. For example, if the flag defaults to FALSE, it may be switched to TRUE in order to diagnose or avoid stability problems. These stability problems may arise during a development cycle or during operation in the field.

2) When memory leaks are detected: In this exemplary condition, when any widgets of a DOM are destroyed, the algorithm may check for memory leaks. In Dojo, an open source modular JavaScript library that is publicly available, this may be accomplished by looking through existing widgets for orphaned widgets, i.e., left-over widgets that no longer have parent widgets in the DOM or no longer have parent widgets that are attached to the DOM. Also, when constructing the new workarea UI, if one of the widgets cannot be constructed because it is found to already exist (i.e., its ID is already in use), this implies that the DOM was not cleaned up from the last page load. In response to any of these exemplary memory leaks, the navigational algorithm may force a page reload of the DOM to provide the new workarea UI within the DOM. An error log (preferably on the server hosting the DOM) may track and indicate the problem for future diagnosis.

3) When the workarea UI is in a "Penalty Box": In this exemplary condition, if a workarea UI, or all the workarea UIs from a given exploiter or contributor (an organization which supports individual workarea UIs), are found to be leaking memory or otherwise destabilizing the DOM, then those workarea UIs may be tagged "penaltyBox" to indicate that this particular workarea UI is not functioning properly. Any time the user is navigating away from any workarea UI that is indicated as penaltyBox, the navigational algorithm may trigger a page refresh to reload the DOM. One possible practice would be to place all new workarea UIs (or exploiters) on probation in this way, until the workarea UIs are proven mature and stable within the DOM due to a lack of memory leaks over time.

4) Based on a domain of the workarea UI: In this exemplary condition, each workarea UI may be categorized based on which exploiter provides the workarea UI, indicating a different domain. A domain might be "storage," "networking," "virtualization," etc. When the user is navigating inside a particular domain, the DOM is never reloaded, instead each effected workarea UI is refreshed within the DOM. However, when the user crosses from a current domain to another domain, a DOM reload occurs. This has the advantage of putting each domain inside its own DOM, so that each exploiter (which has its own domain) owns its own problems. In this way, exploiters may not assign blame to one another when a problem occurs. (This is an ongoing and frequently encountered problem in systems management products.) This mechanism may be more easily understood by users when any menus and context menus are organized by domains, so that the user is allowed to learn to anticipate which tasks trigger a page reload and which only result in a workarea UI refresh within the DOM. Note that the basic framework pages of the DOM are not counted as part of any one domain, and may be navigated to and from without a reload, according to one embodiment.

5) Based on time: In this exemplary condition, the navigational algorithm may trigger a DOM reload, after a predetermined amount of time has passed since a last reload. For example, this condition may be triggered when 10 minutes of usage have passed, 30 minutes of usage, 1 hour, 1 day, etc. This condition may be used to enforce good hygiene in the DOM.

6) Based on usage: In this exemplary condition, after a certain amount of activity since a last page reload, the navigational algorithm may trigger a DOM reload. Any criteria may be used to determine usage, such as a number of workarea UI navigations, page navigations, refreshes using AJAX, etc. In one embodiment, when a predetermined number of active listeners and/or handles is observed, a DOM reload may be triggered. The predetermined number should be large enough that it implies a leak in the listeners or handles, and cannot be triggered during normal use. This condition may also be used to enforce good hygiene in the DOM.

7) Based on performance: In this exemplary condition, when the performance of the DOM or individual workarea UIs within the DOM drops below a performance threshold, the navigational algorithm may trigger a DOM reload. Any criteria may be used to determine performance, such as an amount of resources being used to perform tasks, processor usage, time needed to execute a task, or any other criteria known to one of skill in the art to indicate performance. The performance threshold may be predetermined or may be a dynamic value based on metrics achieved by the DOM in typical operation.

Any of the above described conditions, and those not specifically described, may be initialized and/or managed using a graphical user interface (GUI), in which a user may select certain parameters, thresholds, and/or values for any condition, and may assign certain conditions to certain workarea UIs, such that these workarea UIs will be refreshed using a page load only when the condition is satisfied according to the settings in the GUI.

In operation 306, when it is determined to reload the DOM, the DOM is reloaded, e.g., the page is reloaded and all workarea UIs within the page are reloaded, thereby providing updated workarea UIs and ensuring good DOM hygiene and increased stability.

In operation 308, when it is determined to refresh the one or more workarea UIs, the one or more workarea UIs are refreshed without reloading the DOM, e.g., the page is not reloaded, but one or more individual workarea UIs are refreshed within the DOM, thereby providing one or more updated workarea UIs that are refreshed more quickly than possible using a DOM reload.

In one embodiment, AJAX may be used to refresh the one or more workarea UIs without reloading the DOM.

After either of operations 306 and/or 308 are executed, the method 300 waits, possibly for another request to be received, at which point the method 300 returns to operation 302. Otherwise, the method 300 is ended as no other requests are received.

According to another embodiment, experimentation and usage of the navigational algorithm may result in triggers which are most effective, and whether new triggers need to be devised to account for situations unforeseen prior to implementation. These new triggers may be incorporated to cause page reloads instead of simply refreshing one or more workarea UIs within the DOM.

According to one embodiment, a system for conditionally refreshing workarea UIs may be used. The system may include: logic adapted to receive a request to refresh one or more workarea UIs, wherein the one or more workarea UIs are provided within a DOM; logic adapted to determine whether to reload the DOM or to refresh the one or more workarea UIs within the DOM without reloading the DOM; logic adapted to reload the DOM when it is determined to reload the DOM; and logic adapted to refresh the one or more workarea UIs without reloading the DOM when it is determined to refresh the one or more workarea UIs.

Any other embodiments and/or approaches described in regard to method 300 may be included as logic in the system, according to various implementations.

In another embodiment, the method 300 may be implemented as a computer program product stored to a computer readable storage medium. Each operation of the method 300 may be implemented in computer readable program code executable and/or readable by a computer.

Although some algorithms may provide a caching function which caches a certain number of pages in the DOM in order to provide a faster reload time, this is generally only effective if a few of the pages will be reused heavily. When the number of pages that are used in any given system is too large, such as for systems management solutions, the caching approach is not an adequate solution, on its own. In addition, over time, third parties, contributors, and exploiters may add more pages to the ecosystem, and the user may visit many new pages during any of the various common use cases. Accordingly, more than a simple caching function is needed to provide for these use cases.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for conditionally refreshing workarea user interfaces (UIs), the system comprising:
   logic configured to receive a request to refresh one or more workarea UIs, wherein the one or more workarea UIs are provided within a document object model (DOM), and wherein the one or more workarea UIs each comprise a flag which indicates to either: always reload the DOM when refreshing the workarea UI indicating a page-oriented setup, or not reload the DOM when refreshing the workarea UI indicating a single-page setup;
   logic configured to determine, separately for each of the one or more workarea UIs based on each workarea UI's flag, whether to reload the DOM to refresh a corresponding workarea UI or to refresh the corresponding workarea UI within the DOM without reloading the DOM;
   logic configured to reload the DOM in response to a determination to reload the DOM; and
   logic configured to refresh the one or more workarea UIs without reloading the DOM in response to a determination to refresh the one or more workarea UIs,
   wherein the DOM is reloaded in response to navigating away from a workarea UI that has been flagged for consistently leaking memory.

2. The system as recited in claim 1, wherein JavaScript and/or Asynchronous JavaScript and eXtensible markup language (AJAX) is used to refresh the one or more workarea UIs without reloading the DOM, wherein the logic configured to determine whether to reload the DOM or to refresh the one or more workarea UIs within the DOM without reloading the DOM further comprises logic configured to determine whether a predetermined amount of usage of the DOM has taken place since the DOM was last reloaded, the usage being measured as number of: active listeners, active handles, or active listeners and active handles, and wherein it is determined to reload the DOM in response to the predetermined amount of usage being observed.

3. The system as recited in claim 1, wherein the logic configured to determine whether to reload the DOM or to refresh the one or more workarea UIs within the DOM without reloading the DOM comprises determining whether one or more conditions have been satisfied in addition to determining a flag of the at least one of the one or more workarea UIs, wherein in response to any condition being satisfied, it is determined to reload the DOM; otherwise, in response to none of the one or more conditions being satisfied, it is determined to refresh the one or more workarea UIs without reloading the DOM, and wherein the one or more conditions include a memory leak being detected in the one or more workarea UIs.

4. The system as recited in claim 3, wherein the one or more conditions consist of:
   the memory leak being detected in the one or more workarea UIs;
   it is indicated that the one or more workarea UIs have been flagged for consistently leaking memory;
   the one or more workarea UIs are from a different domain than a current workarea UI;
   a predetermined amount of usage has taken place since the DOM was last reloaded; and
   performance of the one or more workarea UIs drops below a performance threshold.

5. The system as recited in claim 4, wherein a memory leak is detected in response to detection of any of: an orphaned widget being found in existing widgets of the DOM, any widgets of the DOM being destroyed, and a widget failing to be constructed because it is found to already exist.

6. The system as recited in claim 4, wherein a first workarea UI is flagged for consistently leaking memory when any workarea UI from an exploiter common to the first workarea UI is found to have caused a memory leak in the DOM, or the first workarea UI is found to have caused a memory leak.

7. The system as recited in claim 4, wherein the one or more workarea UIs are from a different domain than a current workarea UI when the one or more workarea UIs that are being navigated to are provided by a different exploiter than the current workarea UI.

8. The system as recited in claim 4, wherein the usage that has taken place since the DOM was last reloaded is measured using at least one of: a number of workarea UI navigations, DOM navigations, and refreshes without reloads.

9. The system as recited in claim 4, wherein the performance threshold is either: a predetermined value or a dynamic value based on typical performance of the DOM.

10. The system as recited in claim 1, wherein the flag is defaulted to indicate to never reload the DOM when refreshing the workarea UI except for new workarea UIs which are placed on probation and flagged for leaking memory until confirmation is received that the DOM lacks memory leaks over a predetermined period of time after loading the new workarea UI, and wherein the flag is user selectable.

11. A method for conditionally refreshing workarea user interfaces (UIs), the method comprising:
   receiving a request to refresh one or more workarea UIs, wherein the one or more workarea UIs are provided within a document object model (DOM), wherein at least one of the one or more workarea UIs comprises a flag which indicates to either: always reload the DOM when refreshing the workarea UI, or never reload the DOM when refreshing the workarea UI;
   determining whether to reload the DOM or to refresh the one or more workarea UIs within the DOM without reloading the DOM based on at least a flag of the at least one of the one or more workarea UIs, wherein the DOM is always reloaded when refreshing one or more particular workarea UIs;
   reloading the DOM in response to a determination that the one or more particular workarea UIs are included in the DOM or the flag of the at least one of the one or more workarea UIs indicates to always reload the DOM;
   refreshing the one or more workarea UIs without reloading the DOM in response to a determination to refresh the one or more workarea UIs within the DOM without reloading the DOM; and
   placing a new workarea UI on probation and flagging the new workarea UI for leaking memory until confirmation that the DOM lacks memory leaks over a predetermined period of time after loading the new workarea UI.

12. The method as recited in claim 11, wherein JavaScript and/or Asynchronous JavaScript and eXtensible markup language (AJAX) is used to refresh the one or more workarea UIs without reloading the DOM, wherein the determining whether to reload the DOM or to refresh the one or more workarea UIs within the DOM without reloading the DOM comprises determining whether a predetermined amount of usage of the DOM has taken place since the DOM was last reloaded, the usage being measured as number of: active listeners, active handles, or active listeners and active handles, and wherein it is determined to reload the DOM in response to the predetermined amount of usage being observed.

13. The method as recited in claim 11, wherein the determining whether to reload the DOM or to refresh the one or more workarea UIs within the DOM without reloading the DOM comprises determining if one or more conditions have been satisfied in addition to determining a flag of the at least one of the one or more workarea UIs, wherein when any condition is satisfied, it is determined to reload the DOM; otherwise, the one or more workarea UIs are refreshed without reloading the DOM, and wherein the one or more conditions include a memory leak being detected in the one or more workarea UIs.

14. The method as recited in claim 13, wherein the one or more conditions consist of:
the memory leak being detected in the one or more workarea UIs;
it is indicated that the one or more workarea UIs have been flagged for consistently leaking memory;
the one or more workarea UIs are from a different domain than a current workarea UI;
a predetermined amount of usage has taken place since the DOM was last reloaded; and
performance of the one or more workarea UIs drops below a performance threshold.

15. The method as recited in claim 14, wherein a memory leak is detected when any of: an orphaned widget is found in existing widgets of the DOM, any widgets of the DOM are destroyed, and a widget cannot be constructed because it is found to already exist.

16. The method as recited in claim 14, wherein a first workarea UI is flagged for consistently leaking memory when any workarea UI from an exploiter common to the first workarea UI is found to have caused a memory leak in the DOM, or the first workarea UI is found to have caused a memory leak, and wherein a page reload is required when navigating away from a workarea UI that has been flagged for consistently leaking memory.

17. The method as recited in claim 14, wherein the one or more workarea UIs are from a different domain than a current workarea UI when the one or more workarea UIs that are being navigated to are provided by a different exploiter than the current workarea UI.

18. The method as recited in claim 14, wherein the usage that has taken place since the DOM was last reloaded is measured using at least one of: a number of workarea UI navigations, DOM navigations, and refreshes without reloads.

19. The method as recited in claim 14, wherein the performance threshold is either: a predetermined value or a dynamic value based on typical performance of the DOM.

20. A computer program product, comprising a non-transitory computer readable storage medium having program instructions embodied therewith, the embodied program instructions being readable by a processor to cause the processor to:
receive a request to refresh one or more workarea UIs, wherein the one or more workarea UIs are provided within a document object model (DOM), and wherein the one or more workarea UIs each comprise a flag which indicates to either: always reload the DOM when refreshing the workarea UI indicating a page-oriented setup, or not reload the DOM when refreshing the workarea UI indicating a single-page setup;
determine, separately for each of the one or more workarea UIs based on each workarea UI's flag and whether one or more conditions have been satisfied, whether to reload the DOM to refresh a corresponding workarea UI or to refresh the corresponding workarea UI within the DOM without reloading the DOM, wherein it is determined to reload the DOM in response to at least one of the one or more conditions being satisfied and it is determined to refresh the one or more workarea UIs without reloading the DOM in response to none of the one or more conditions being satisfied, and wherein the one or more conditions include a memory leak being detected in the one or more workarea UIs;
reload the DOM in response to a determination to reload the DOM; and
refresh the one or more workarea UIs without reloading the DOM in response to a determination to refresh the one or more workarea UIs.

21. The computer program product as recited in claim 20, wherein the embodied program instructions further cause the processor to place a new workarea UI on probation and flag the new workarea UI for leaking memory until confirmation that the DOM lacks memory leaks over a predetermined period of time after loading the new workarea UI.

22. The computer program product as recited in claim 20, wherein the one or more conditions consist of:
the memory leak being detected in the one or more workarea UIs;
it is indicated that the one or more workarea UIs have been flagged for consistently leaking memory;
the one or more workarea UIs are from a different domain than a current workarea UI;
a predetermined amount of usage has taken place since the DOM was last reloaded; and
performance of the one or more workarea UIs drops below a performance threshold.

23. The computer program product as recited in claim 22, wherein a memory leak is detected when any of: an orphaned widget is found in existing widgets of the DOM, any widgets of the DOM are destroyed, and a widget cannot be constructed because it is found to already exist.

24. The computer program product as recited in claim 22, wherein the embodied program instructions further cause the processor to flag a first workarea UI for consistently leaking memory in response to a determination that any workarea UI from an exploiter common to the first workarea UI is found to have caused a memory leak in the DOM, or in response to a determination that the first workarea UI has caused a memory leak, and wherein a page reload is required when navigating away from a workarea UI that has been flagged for consistently leaking memory.

25. A method for conditionally refreshing workarea user interfaces (UIs), the method comprising:
receiving a request to refresh one or more workarea UIs, wherein the one or more workarea UIs are provided within a document object model (DOM), wherein at least one of the one or more workarea UIs comprises a flag which indicates to either: always reload the DOM when refreshing the workarea UI, or never reload the DOM when refreshing the workarea UI;
determining whether to reload the DOM or to refresh the one or more workarea UIs within the DOM without reloading the DOM based on a flag of the at least one of the one or more workarea UIs and a determination of whether one or more conditions have been satisfied,
wherein the DOM is always reloaded when refreshing one or more particular workarea UIs, wherein in response to at least one condition being satisfied, it is determined to reload the DOM, wherein in response to none of the one or more conditions being satisfied, the one or more workarea UIs are refreshed without reloading the DOM, and wherein the one or more conditions include a memory leak being detected in the one or more workarea UIs;

reloading the DOM in response to a determination that the one or more particular workarea UIs are included in the DOM or the flag of the at least one of the one or more workarea UIs indicates to always reload the DOM; and refreshing the one or more workarea UIs without reloading the DOM in response to a determination to refresh the one or more workarea UIs within the DOM without reloading the DOM.

26. The method as recited in claim 25, wherein JavaScript and/or Asynchronous JavaScript and eXtensible markup language (AJAX) is used to refresh the one or more workarea UIs without reloading the DOM, wherein the determining whether to reload the DOM or to refresh the one or more workarea UIs within the DOM without reloading the DOM comprises determining whether a predetermined amount of usage of the DOM has taken place since the DOM was last reloaded, the usage being measured as number of: active listeners, active handles, or active listeners and active handles, and wherein it is determined to reload the DOM in response to the predetermined amount of usage being observed.

27. The method as recited in claim 25, further comprising placing a new workarea UI on probation and flagging the new workarea UI for leaking memory until confirmation that the DOM lacks memory leaks over a predetermined period of time after loading the new workarea UI.

28. The method as recited in claim 25, wherein the one or more conditions consist of:

the memory leak being detected in the one or more workarea UIs;

it is indicated that the one or more workarea UIs have been flagged for consistently leaking memory;

the one or more workarea UIs are from a different domain than a current workarea UI;

a predetermined amount of usage has taken place since the DOM was last reloaded; and performance of the one or more workarea UIs drops below a performance threshold.

29. The method as recited in claim 28, wherein a memory leak is detected when any of: an orphaned widget is found in existing widgets of the DOM, any widgets of the DOM are destroyed, and a widget cannot be constructed because it is found to already exist, wherein a first workarea UI is flagged for consistently leaking memory when any workarea UI from an exploiter common to the first workarea UI is found to have caused a memory leak in the DOM, or the first workarea UI is found to have caused a memory leak, wherein a page reload is required when navigating away from a workarea UI that has been flagged for consistently leaking memory, wherein the one or more workarea UIs are from a different domain than a current workarea UI when the one or more workarea UIs that are being navigated to are provided by a different exploiter than the current workarea UI, wherein the usage that has taken place since the DOM was last reloaded is measured using at least one of: a number of workarea UI navigations, DOM navigations, and refreshes without reloads, and wherein the performance threshold is either: a predetermined value or a dynamic value based on typical performance of the DOM.

* * * * *